United States Patent [19]

Kobayashi et al.

[11] Patent Number: 5,769,393
[45] Date of Patent: Jun. 23, 1998

[54] LIQUID CRYSTAL ELEMENTS AND METHOD OF PRODUCING SAME

[75] Inventors: Hidekazu Kobayashi; Kiyohiro Samizu, both of Suwa, Japan

[73] Assignee: Seiko Epson Corporation, Tokyo, Japan

[21] Appl. No.: 78,204

[22] PCT Filed: Oct. 21, 1992

[86] PCT No.: PCT/JP92/01367

§ 371 Date: Aug. 16, 1993

§ 102(e) Date: Aug. 16, 1993

[87] PCT Pub. No.: WO93/08497

PCT Pub. Date: Apr. 29, 1993

[30] Foreign Application Priority Data

| Oct. 22, 1991 | [JP] | Japan | 3-274232 |
| Oct. 25, 1991 | [JP] | Japan | 3-279123 |
| Dec. 17, 1991 | [JP] | Japan | 3-333302 |
| Jan. 22, 1992 | [JP] | Japan | 4-009540 |
| Apr. 24, 1992 | [JP] | Japan | 4-106899 |
| Jun. 1, 1992 | [JP] | Japan | 4-140343 |

[51] Int. Cl.$^6$ .............. C09K 19/52; G02F 1/13
[52] U.S. Cl. ........ 252/299.01; 349/86; 349/88; 349/94; 349/106; 428/1
[58] Field of Search ........ 252/299.01; 349/86, 349/88, 94, 106; 428/1

[56] References Cited

U.S. PATENT DOCUMENTS

| 4,435,047 | 3/1984 | Fergason | 350/334 |
| 5,077,380 | 12/1991 | Hefner et al. | 528/322 |
| 5,188,760 | 2/1993 | Hikmet et al. | 252/299.01 |
| 5,204,763 | 4/1993 | Hikmet | 359/51 |
| 5,210,630 | 5/1993 | Heynderickx et al. | 359/106 |
| 5,305,126 | 4/1994 | Kobayashi et al. | 359/52 |
| 5,372,745 | 12/1994 | Yoshinaga et al. | 252/299.01 |
| 5,384,069 | 1/1995 | Yoshinaga et al. | 252/299.01 |

FOREIGN PATENT DOCUMENTS

| 0412497 | 2/1991 | European Pat. Off. |
| 484972 | 5/1992 | European Pat. Off. |
| 488116 | 6/1992 | European Pat. Off. |
| 55047 | 5/1978 | Japan |
| 63503 | 4/1985 | Japan |
| 47427 | 3/1986 | Japan |
| 502128 | 9/1986 | Japan |
| 43714 | 2/1991 | Japan |
| 52843 | 3/1991 | Japan |
| 119315 | 5/1991 | Japan |
| 209424 | 9/1991 | Japan |
| 04262 | 9/1985 | WIPO |

OTHER PUBLICATIONS

R. A. M. Hikmet, "Electrically Induced Light Scattering From Anisotropic Gels With Negative Dielectric Anisotropy", *Mol. Cryst. Liq. Cryst.*, vol. 213, pp. 117–131, 1992.

D. K. Yang et al., "Cholesteric Liquid Crystal/Polymer Dispersion For Haze–Free Light Shutters", *Applied Physics Letters*, vol. 60(25), pp. 3102–3104, Jun. 22, 1992.

"Liquid crystal/liquid–crystalline network composite systems", by Dietrich Braun, Liquid Crystals, vol. 11, No. 6, Jun. 1992, London GB pp. 929–939.

*Primary Examiner*—Shean C. Wu
*Attorney, Agent, or Firm*—Oliff & Berridge, P.L.C.

[57] ABSTRACT

A display element for use in computer terminals, television displays and other information display devices capable of large capacity, full color display employing active elements, wherein an optical layer comprises liquid crystal and polymer dispersed in one another. The polymer comprises polymer grains directionally aligned in the optical layer by directional alignment of the liquid crystal, which is aligned by treatment provided relative to at least one of the substrates forming the display element. The polymer grains are developed from the polymerization of at least one polymer precursor containing at least one polymerizable portion and at least two aromatic rings with a coupling group provided between the aromatic rings. The polymer precursor contains, as at least one component, a polymer compound without an alkyl group spacer between the polymerizable portion and the aromatic rings.

55 Claims, 7 Drawing Sheets

LIQUID CRYSTAL ELEMENTS AND METHOD OF PRODUCING SAME

BACKGROUND OF THE INVENTION

1. Field of the Invention

The invention relates generally to a polymer dispersed liquid crystal display element wherein the liquid crystal and polymer are dispersed into one another, and, more particularly, to a display element applicable to user interfaces employed for computer displays and television and the method of producing such display elements.

2. Background of the Invention

With the introduction of computers to society in recent years, the development of user interfaces has accelerated. The development of displays is particularly fast paced, but currently the market depends primarily on twisted nematic liquid crystal display devices, which employ two polarizing plates providing a display that is dark. To solve these problems, polymer dispersed liquid crystal display devices have been recently developed. Since these systems do not require polarizing plates, the incident light to the display can be effectively employed. In particular, in operational modes that utilize dichroic dye, the appearance of the element is remarkable when employed as a reflecting type. For example, Fergason utilizes capsulated liquid crystal containing dichroic dye which is dispersed with polymers, as disclosed in Japanese Laid-Open Patent Publication 3-52843, hereinafter referred to as normal polymer PDLC mode. Also, Doane, et al., has proposed a production method whereby liquid crystal containing dichroic dye and polymer precursors are combined and the liquid crystal and polymer are phase separated into a sponge state as performed through polymerization, as disclosed in Japanese Patent Publication 61-502128, hereinafter referred to as normal polymer PDLC mode. Furthermore, employing polymer precursors which take on a liquid crystal state, Hikmet, et al., of Philips Corporation, provided a display element with a structure that was formed with polymer in an aligned state, which is achieved by irradiation with ultraviolet light while in a mixed condition with liquid crystal, and in which the liquid crystal was contained in a gel network, as disclosed in *Mol. Cryst. Liq. Cryst.*, Vol. 213, pp. 117–131, 1992, hereinafter referred to as network type aligned PDLC mode. Unlike previously described modes, the display element of this mode scatters white when an electric field is applied. We have, however, independently developed technology that forms polymer into grains or macromolecules while they are in an aligned state as disclosed, for example, in EPO Publication 488116, hereinafter referred to as grain-aligned PDLC mode. However, sufficiently desired brightness and contrast level cannot be achieved in these modes. Moreover, the driving voltage is not of sufficiently desired low value.

The purpose of the invention is to offer a display element and associated manufacturing method wherein the liquid crystal and polymer are aligned and dispersed in one another providing high brightness and good contrast with low driving voltage.

SUMMARY OF THE INVENTION

According to this invention, a liquid crystal and polymer are aligned and dispersed in one another wherein the polymer or polymers employed are derived from one or more polymer precursors having a polymerizable portion. More particularly, such polymer precursors include at least one component as a polymer precursor having a polymerizable portion and a side chain portion. Alternatively, they may include polymer precursors having two or more polymerizable portions comprising at least one component. The polymer precursors may comprise either ester derivatives with methacrylic acid or acrylic acid, or they are amide derivatives with methacrylic acid or acrylic acid. The polymer precursors contain at least one component comprising a compound having an epoxy group. The polymer precursors may also contain at least one component comprising a compound having at least two aromatic rings, or at least one of the aromatic rings may by hydrogenated, and an ester group between the aromatic rings. The polymer precursors may also contain at least one component comprising a compound having at least two aromatic rings or at least one of the aromatic rings may by hydrogenated, and a urethane group or an amide between the aromatic rings. The polymer precursors may also contain at least one component comprising a compound having at least two aromatic rings, or at least one of the aromatic rings may by hydrogenated, and at least one acetylene group between the aromatic rings. Also, a cyano group, a halogen group or an aromatic ring may be bonded either directly or indirectly to the aromatic rings contained in the polymer precursors. Also, an alkyl group or alkoxy group may be bonded to the polymer precursors.

The above polymer precursors may also contain an optically active polymer compound. The polymer may also contain at least one component comprising a polymer compound containing fluorine. The liquid crystal may also include dichroic dye. The liquid crystal may also include a chiral component. The liquid crystal is a nematic liquid crystal.

The polymers are formed by stimulating a mixture of the polymer precursors and liquid crystal by means of at least one of the group comprising stimuli heat, light and an electron beam. The polymers are formed by first polymerizing the polymer precursors and rendering them compatible with the liquid crystal by gradually heating, after which they are slowly cooled. Alternatively, the polymers are formed by first polymerizing the polymer precursors and rendering them compatible with the liquid crystal by employing a solvent, are then spread onto a substrate, after which the solvent is slowly removed in a manner to allow the polymers to phase separate while aligned with the liquid crystal. The direction of alignment of the liquid crystal/polymer layer is inclined with respect to the surface of the substrate. Also, the direction of alignment of the liquid crystal and the polymer layer is controlled by an alignment treatment of the substrate surfaces between which the liquid crystal/polymer layer is employed. Relative to a particular substrate for alignment of the liquid crystal/polymer layer, the alignment treatment of at least the substrate on the light incident side of the display element is applied in a direction perpendicular to the plane including the plimary direction of light incidence and the normal line of the light incident substrate. Alternatively, the alignment treatment of the light incident substrate is applied in the plane including the primary direction of light incidence and the normal line of the substrate. A light reflective layer or a light diffusing layer is disposed on the back face of the liquid crystal/polymer layer. An optical phase shift plate, e.g., ¼-wavelength plate, is disposed between the liquid crystal/polymer layer and the reflective layer or light-diffusing layer. A color filter is formed on at least one of the substrates between which the liquid crystal/polymer layer is employed. Active elements, e.g., two-terminal elements or three-terminal elements, are formed on at least one of the substrates between which the liquid crystal/polymer layer is employed.

Two display elements of this invention may be mated together such that the directions of alignment of the liquid crystal/polymer layers are perpendicular to one another. The method of producing the display element of this invention comprises forming the liquid crystal/polymer layer by stimulating a mixture of the polymer precursors and liquid crystal by at least one means from the group comprising of the stimuli heat, light and an electron beam, polymerizing the polymer precursors and rendering them compatible with the liquid crystal by gradually heating, after which they are slowly cooled, or alternatively polymerizing the polymer precursors and rendering them compatible with the liquid crystal by employing a solvent and spreading a layer thereof on a substrate, after which the solvent is removed sufficiently slow to allow the polymers to phase separate while aligned with the liquid crystal.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The invention is explained in more detail with reference to several embodiments relative to the drawings.

First Embodiment

Figure 1:
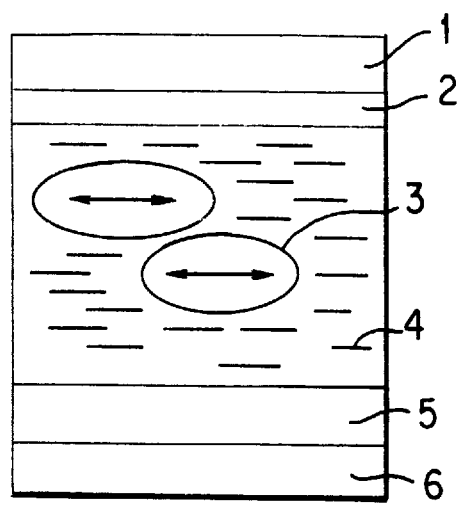
FIG. 1 is a diagrammatic cross sectional view of a horizontally aligned display element according to a first embodiment of this invention.
Figure 2:
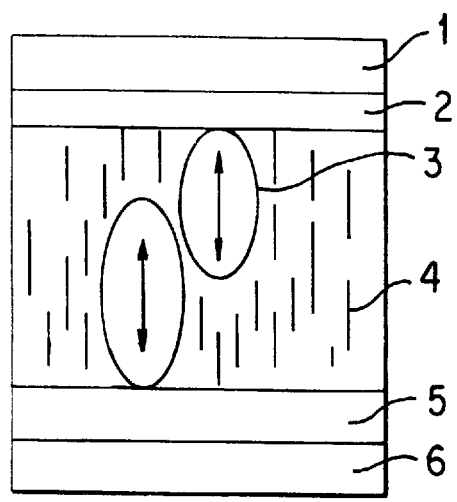
FIG. 2 is a diagrammatic cross sectional view of a vertically aligned display element according to the first embodiment of this invention.

In this embodiment, a methacrylate ester or acrylate ester derivative is employed as the polymer precursor, which have two or more aromatic rings in the side chain, at least one of which may be hydrogenated. A polymer precursor with an ester group is employed between the aromatic rings. FIG. 1 shows a cross section of a horizontally aligned display element of this invention. FIG. 2 shows a cross section of a vertically aligned display element of this invention. Thus, the invention can be applied to both horizontally aligned and vertically aligned types of display elements. In this embodiment, a horizontally aligned type is mainly explained for the sake of convenience. In all of the embodiments below, vertical alignment of the element substrates may be performed and liquid crystal with a negative dielectric anisotropy may be employed.

The production method of the element is explained. First, electrodes 2 and electrodes 5 are formed on the surfaces of substrate 1 and substrate 6, which have flat surfaces. Either of these electrodes may be reflective. The substrate surfaces undergo alignment treatment. The two substrates are fixed such that the gap between them is 5 μm. This need not be 5 μm and may be decided based on the application. For example, since the light path length is cut in half if the device is used as a transmission type, sufficient contrast cannot be obtained unless the gap is doubled to 10 μm from 5 μm.

A nearly transparent element is produced by injecting 4-benzoyloxy phenyl methacrylate,

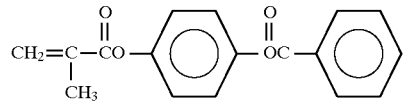

as the precursor for polymer 3 and liquid crystal 4 (comprising a mixture of product No. PN002, available from Rodic Company, 1% of product No. S-1011, available from Merck CO., as a chiral component, and 1.5% of product No. S-428, available from Mitsui Toatsu Senryo K K, as a dichroic dye) in a 1:9 ratio and orienting this mixture, after which phase separation of the liquid crystal and polymer was performed by irradiation with ultraviolet light.

The electro-optical characteristics of the display element were measured in conjunction with a reflective plate, which was disposed behind the display element and an AC electric field with a frequency of 10 KHz was applied between the two electrodes. Then the reflectivity of light from the display element was measured while varying the voltage. At 3.3V, the display condition started to invert (5% reflectivity), and at 4.8V it became saturated (190% reflectivity). Compared to the prior art, the drive voltage dropped, though only slightly, and the degree of scattering of was improved. Reflectivity was measured by comparison with the reflectivity of white paper, which was set at 100%. By disposing the display element so that the direction of alignment of the polymer grains or macromolecules positioned at either the front surface of the display element or the rear surface of the display element are perpendicular to a plane that includes the direction of incident light and a line normal of the display element surface, reflectivity is improved. In contrast, when photo-cured biphenyl derivative 4-biphenyl methacrylate is employed as the polymer precursor to produce a display element by the same method as this invention, which the inventors have previously employed, the display condition started to invert at 3.5V (5% reflectivity) and becomes saturated (180% reflectivity) at 5.0V. In the case here, 100% reflectivity is when a sheet of white paper was disposed in lieu of the display element. It is clear that the method of this embodiment improves scattering at low voltage operation.

The characteristics of the display element were also measured using a transmission type optical system. In this case, the display element was produced with transparent electrodes formed on the display element substrate without incorporation of dichroic dye. The brightness of the light transmitted by the display element was measured compared to the brightness of the incident light, which was set at 100%. An aperture was disposed directly in front of the light detector to eliminate scattered light from the display element. The diameter of the aperture was set so that the viewing angle of the element was 3°. The electric field applied on the display element was applied under the same conditions as above. The display condition began to invert at 3.5V (85% transmissivity), and the display became saturated at 5.0V (5% transmissivity). The application here may be either the transmissive type or the reflective type.

In another example, a display element utilized an ester group included between a biphenyl group and a phenyl group that includes three or more aromatic rings. For example, 4-(4'-biphenyl carboxyl) phenyl methacrylate is employed.

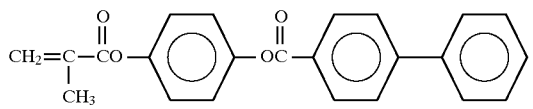

The display element was produced and voltage driven in the same manner as described above. The display condition began to invert at 4V (5% reflectivity), and the display became saturated at 5.5V (190% reflectivity). The same effect was demonstrated with a transmissive type display.

In a further example, a display element utilized a naphthalene group included in the polymer precursor, and the direction in which the ester group is added is opposite. Other than the kind of polymer precursor, the display element was produced under the conditions as previously described. Here, 4-(2'-naphthoxy carbonyl) phenyl methacrylate was employed as an ultraviolet-cured polymer precursor.

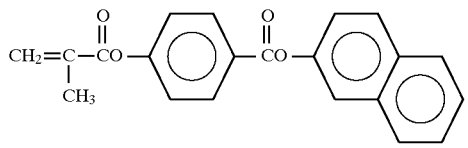

The display condition began to invert at 3V, (5% reflectivity), and the display became saturated at 4V (80% reflectivity). The same effect was demonstrated with a transmissive type display.

The same effects are achieved with polymer precursors other than those described above if the polymer precursor has a basic skeleton formula indicated by

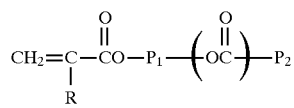

wherein $P_1$ and $P_2$ include aromatic rings,
the group in the parentheses may be bonded in reverse, and R is H or $CH_3$.

In the foregoing examples, the polymerizable portion employed in the polymer may be acrylic, methacrylic, crotonic acid, fumaric acid, maleic acid, a vinyl group, an epoxy group or other polymer group. Of course, R in the foregoing chemical formula may be an alkyl group or other substituent. Also, a polymer precursor with a polymerizable portion that is hardened by means of heat or an electron beam may be employed. Regarding the aromatic rings, at least one of them can be hydrogenated. For example,

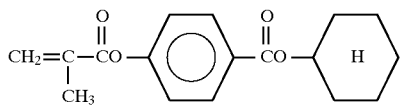

may be employed. The aromatic rings are not limited to phenyl groups, as biphenyl, terphenyl, naphthalene, anthracene and other polycyclic aromatic rings can be employed. Para-substitution was used as the substitution mode for the aromatic rings, but they will function as a display element with meta-substitution or ortho-substitution. However, the degree of scattering readily drops. Further, though there are no substituents in the aromatic rings other than bonds with other aromatic rings, superior characteristics can be manifested by inserting such substituents as a cyano group, a halogen group, an alkyl group or an alkoxy group as described below. Also, at least one of the structures of the urethane group, amide group or acetylene group, described later, can be employed. Fluorine may also be substituted for H in the compound.

Ultraviolet light is employed when an external field is applied at the time of polymerization, utilizing a wavelength between 300 nm to 400 nm with an intensity of 2 $mW/cm^2$. Any wavelength and intensity may be employed, however, that will polymerize the polymer precursor. Particularly in the case wherein weak light is irradiated for a long period of time, it becomes more difficult for dichroic dye to be contained in the polymer when dichroic dye is employed, for the purpose of improving optical characteristics. When an initiator or sensitizer is mixed in the mixture, polymerization can be effectively promoted. Polymerization can also be performed by means of an electron beam. For example, sufficient polymerization can be achieved by employing an electron beam accelerated at 250 KV by making the thickness of the substrate on the side on which the electron beam is incident to the mixture sufficiently thin, e.g., 100 $\mu$m. It is also possible to mix in a polymerization initiator and achieve polymerization with heat.

Alignment treatment may be performed by any conventional means for alignment of the liquid crystal phase, such as, rubbing the bare substrate surface, forming an alignment film and rubbing the surface of the alignment film, employing oblique deposition, employing an LB film or employing a vertical alignment agent. Also, alignment treatment applied to only one substrate is effective. The direction of substrate treatment alignment may be in any direction, and the alignment direction of the front substrate and that of the rear substrate can be different. However, it is necessary to optimize the direction to match the direction of incident light and the diffusion profile required for the display element. Also, as described later, by inclining the direction of alignment of the polymer grains with respect to the substrate surface and reducing the drive voltage, the direction of distinctive visibility can be optimized.

The liquid crystal employed should have an index of refractive anisotropy, $\Delta n$, as large as possible. Also, the dielectric anisotropy of the liquid crystal may be positive. The preferred amount of liquid crystal contained in the mixture is in the range between 50% to 97% with respect to the polymer precursor. When the amount of liquid crystal is less than this amount, the mixture will not respond to an electric field. When the amount of liquid crystal is more than this amount, contrast cannot be achieved. Also, by employing liquid crystal with high resistivity, the liquid crystal can be driven by means of active elements.

The dichroic dye employed need not be that described here. Also, its content ratio can be optimized depending on the particular application. If dichroic dye is not mixed in the mixture, a mode is made possible wherein the display element is transparent when the applied electric field is OFF and is scattered white when the applied electric field is ON.

In the examples here, a chiral component was mixed in the mixture, but which chiral component is employed is not critical and the amount mixed in the mixture can be determined based on the particular application. When a large amount is mixed in the mixture, the drive voltage must be increased, but a memory characteristic is manifested. The display element will also function in the case where a chiral component is not employed in the mixture.

Second Embodiment

In this embodiment, the polymer precursors are an ester methacrylate or ester acrylate derivative having two or more aromatic rings as a side chain and at least one of the aromatic rings may be hydrogenated. A polymer precursor with a urethane group or an amide group is employed between these aromatic rings. The polymer precursor employed was 4-methacryloyloxy phenyl-phenylcarbamate.

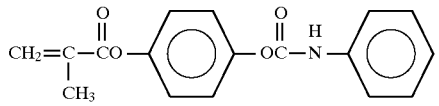

The display element was produced in the same manner under the same conditions as employed in the first embodiment.

The electro-optical characteristics of the display element were measured by the method employed in connection with the first embodiment. The display began to invert at 3.5V (5% reflectivity), and the display became saturated at 5V (180% reflectivity).

In another example, an amide group was employed as the polymer precursor. Phenylcarbamoyl phenyl-4-methacrylate,

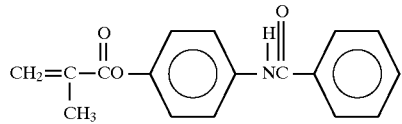

was employed as the polymer precursor, and the display element was produced under the same conditions as in the case of the first embodiment.

The electro-optical characteristics of the element were measured according to the method of the first embodiment. The display began to invert at 3.5V (5% reflectivity), and the display became saturated at 5V (180% reflectivity).

In addition to the polymer precursors described above in this embodiment, the same effect can be achieved with any polymer precursor having the following basic skeleton formula:

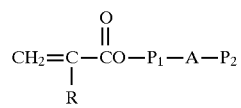

where, $P_1$ and $P_2$ include aromatic rings,
A is either OCONH or NHCO, which may be bonded in reverse, and
R is H or $CH_3$.

Here, the polymerizable portion may be acrylic, methacrylic, crotonic acid, fumaric acid, maleic acid, a vinyl group, an epoxy group or other polymer group. Of course, the R in the chemical formula may be an alkyl group or other substituent. Also, a polymer precursor with a polymerizable portion that is hardened by means of heat or an electron beam may be employed. Regarding the aromatic rings, at least one can be hydrogenated. For example,

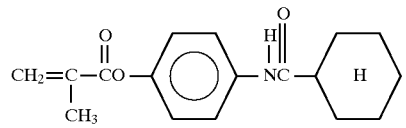

may be employed. The aromatic rings are not limited to phenyl groups, as biphenyl, terphenyl, naphthalene, anthracene and other polycyclic aromatic rings can be employed. Para-substitution was used as the substitution mode for the aromatic rings, but they will function as an element with meta-substitution or ortho-substitution. However, the degree of scattering readily drops. Further, though there are no substituents in the aromatic rings other than bonds with other aromatic rings, superior characteristics can be manifested by inserting such substituents as a cyano group, a halogen group, an alkyl group or an alkoxy group as described below. Also, at least one of the structures of the ester group shown in the first embodiment or the group, described later, can be employed. Fluorine can also be substituted for H in the compound.

The other element component portions, conditions for production and applications are the same as in the first embodiment.

Third Embodiment

In this embodiment, the polymer precursors are an ester methacrylate or ester acrylate derivative having two or more aromatic rings as a side chain and at least one of the aromatic rings may be hydrogenated. There is an acetylene group between these aromatic rings. First, there is an example that employs a polymer precursor having two polymerizable portions. The polymer precursor employed is di-(para-methacryloyloxy phenyl) acetylene,

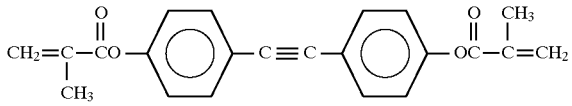

Other production conditions were the same as in the case of the first embodiment with the liquid crystal and the polymer undergoing phase separation.

The electro-optical characteristics of the display element were measured according to the method applied in the first embodiment. The display began to invert at 4 V (5% reflectivity), and the display became saturated at 6 V (210% reflectivity).

In another example, an acetylene compound with one polymerizable portion was employed. Para-methacryloyloxy tolan,

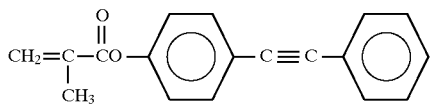

was employed. Other than the use of this polymer precursor, production conditions were the same as in the case of the first embodiment.

The electro-optical characteristics were measured according the method of the first embodiment. The display began to invert at 3.5 V (5% reflectivity), and the display became saturated at 5.5 V (200% reflectivity).

In a further example, a polymer precursor having two acetylene bonds and containing no alkyl side chain was employed. The element was produced according to the conditions of the first embodiment. Here, 1-(4'-methacryloyloxy phenyl)-4-phenyl-1,3-butadiene,

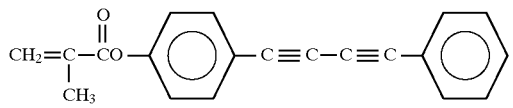

was employed.

Next, the electro-optical characteristics of the element were measured according to the same method as in the case of the first embodiment. The display began to invert at 3.5 V (5% reflectivity), and the display became saturated at 5.5 V (200% reflectivity).

The skeleton formula for the polymer precursor employed in this embodiment may be written as:

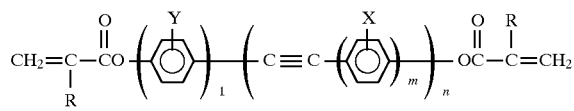

where, X, Y are substituents,
l, m are positive integers (including zero),
n is a positive number, and
R is H or $CH_3$.
in the case of two polymerizable portions, and as:

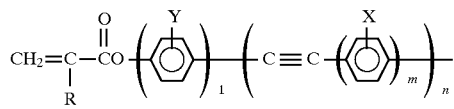

where, X, Y are substituents,
l, m are positive integers (including zero),
n is a positive number, and
R is H or $CH_3$.
in the case of one polymerizable portion. Combinations of X, Y, l, m and n make it possible to use various different kinds of compounds. For example, assuming n=2, two acetylene skeletons may be joined. When n is plural, X is repeated a plural number of times, but, of course, the skeleton can be changed each time. The same is true with m. In addition to aromatic rings and an acetylene skeleton, the polymer precursor may have a skeleton that increases the index of refractive anisotropy. Further, these polymer precursors may be mixed with other polymer precursors, e.g., single-function polymer precursors, such as, biphenyl methacrylate. The polymerizable portion may be acrylic, methacrylic, crotonic acid, fumaric acid, maleic acid, a vinyl group, an epoxy group or other polymer group. Of course, R in the chemical formula may be an alkyl group or other substituent. Also, a polymer precursor with a polymerizable portion that is hardened by means of heat or an electron beam may be employed. Regarding the aromatic rings, at least one can be hydrogenated. The aromatic rings are not limited to phenyl groups, as biphenyl, terphenyl, naphthalene, anthracene and other polycyclic aromatic rings can be employed. Para-substitution was used as the substitution mode for the aromatic rings, but they will function as an element with meta-substitution or ortho-substitution. However, the degree of scattering readily drops. Further, though there are no substituents in the aromatic rings other than bonds with other aromatic rings, superior characteristics can be manifested by inserting such substituents as a cyano group, a halogen group, an alkyl group or an alkoxy group as described below. Also, at least one of the structures of the ester group, amide group or urethane group, described later, can be employed. Fluorine can also be substituted for H in the compound.

In this embodiment, two-function and single-function polymer precursors were shown, but by mixing two-function polymer precursors with single-function polymer precursors, a display element with a low drive voltage and good heat resistance and durability can be produced.

Fourth Embodiment

This embodiment demonstrates an example in which the polymer precursor is an amide of acrylic acid or methacrylic acid. Biphenyl methacrylic amide,

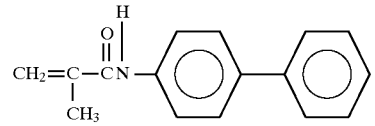

was employed as the polymer precursor and the element was produced under the same conditions as in the third embodiment.

The electro-optical characteristics of the element were measured according to the method used in the first embodiment. The display began to invert at 3.5 V (5% reflectivity), and the display became saturated at 5 V (180% reflectivity).

N-methyl biphenyl methacrylic amide, or the like, may also be used as the polymer precursor.

As shown by the formula,

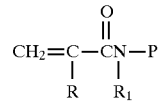

where, P includes an aromatic ring, and
R, $R_1$ are H or $CH_3$,
the side chain may have an aromatic ring. Even in the case where there are plural aromatic rings, the display element will function. Even in embodiments other than this embodiment, if the ester group that bonds the polymer part and the side chain is changed to an amide group, it can similarly be used as a polymer precursor. The display element can be produced. The aromatic rings are not limited to phenyl groups, and biphenyl, terphenyl, naphthalene, anthracene and other polycyclic aromatic rings can be used. Para-substitution was used as the substitution mode for the aromatic rings, but they will function as an element with meta-substitution or ortho-substitution. Though there are no substituents in the aromatic rings other than bonds with other aromatic rings, superior characteristics can be manifested by inserting such substituents as a cyano group, a halogen group, an alkyl group or an alkoxy group as described below. Also, at least one of the structures of the ester group, amide group, urethane group or acetylene group, described later, can be employed. Fluorine can also be substituted for H in the compound. The polymerizable portion may be acrylic, methacrylic, crotonic acid, fumaric acid, maleic acid, a vinyl group, an epoxy group or other polymer group. The R in the chemical formula may be an alkyl group or other substituent. Also, since N is included in this compound, H, $CH_3$, an alkyl group or other substituent can be introduced for N or it may be a polymerized substituent.

Fifth Embodiment

This embodiment demonstrates an example wherein a cyano group, a halogen group or an aromatic ring are bonded directly or indirectly to the aromatic ring contained in the polymer precursor. As shown by the formula,

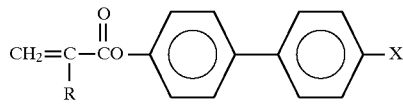

where, R is H or $CH_3$, and

X is CN, F, Cl, Br, I or an aromatic ring (may contain other elements), a polymer precursor is employed wherein a cyano group, a fluoro group, a chloro group, a bromo group, an iodine group or an aromatic ring is substituted for biphenyl methacrylate. The liquid crystal material, substrate and production conditions, and measurement conditions were produced under the same conditions as in the case of the first embodiment. As to electro-optical characteristics, the display condition began to invert at 3 V (5% reflectivity) and became saturated at 5 V (200% reflectivity) when a cyano group was substituted. When a halogen group was substituted, the reflectivity was improved over that without substitution, and the electro-optical characteristic was improved in the following order: iodine group (195% reflectivity)>bromo group (190% reflectivity)>chloro group (185% reflectivity) >fluoro group (180% reflectivity). When a phenyl group was substituted, an extremely bright display was achieved having 220% reflectivity.

Para-substitution was used as the substitution mode for the aromatic rings, but they will function as an element with meta-substitution or ortho-substitution. In addition to a phenyl group, the basic skeleton formula of the polymer precursor employed here may be biphenyl, terphenyl, naphthalene, anthracene or other polycyclic aromatic ring or the basic skeleton formula of an embodiment other than this embodiment for the aromatic ring. For example,

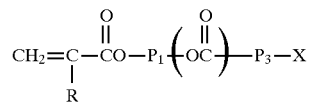

where, $P_1$, $P_3$ contain aromatic rings, the part in parentheses may be bonded in reverse, R is H or $CH_3$, and X is CN, F, Cl, Br, I or an aromatic ring (may contain other elements),

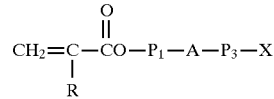

where, $P_1$, $P_3$ contain aromatic rings,

A is OCONH or NHCO and may be bonded in reverse,

R is H or $CH_3$, and

X is CN, F, Cl, Br, I or an aromatic ring (may contain other elements),

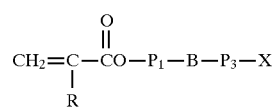

where, $P_1$, $P_3$ contain aromatic rings,

B includes an acetylene skeleton,

R is H or $CH_3$, and

X is CN, F, Cl, Br, I or an aromatic ring (may contain other elements), or

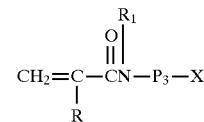

where, $P_3$ contains an aromatic ring,

R, $R_1$ are H or $CH_3$,

X is CN, F, Cl, Br, I or an aromatic ring (may contain other elements).

The substituents, shown here, may be inserted directly or indirectly, and their number is not limited to just one. Also, including different types of the ester groups, amide groups, urethane groups and acetylene groups, shown here, may be included as two or more. In other words, all of the compounds shown in this invention may be employed as a basic polymer precursor. Also, the substitution mode is not limited to para-substitution, and meta-substitution or ortho-substitution can used. Of course, the same effect is manifested even if plural types of substituents are introduced. When an aromatic ring is used as a substituent, one or more, or one or more types, of substituents, such as, those shown here, alkyl groups or alkoxy groups, may be substituted directly or indirectly for the aromatic ring. Also, a mixture of the polymer precursors shown here or the polymer precursors shown in other embodiments can be employed. Here, the polymerizable portion may be acrylic, methacrylic, crotonic acid, fumaric acid, maleic acid, a vinyl group, an epoxy group or other polymer group. The R in the chemical formula may be an alkyl group or other substituent.

Since N may be contained in a chemical formula above, H, CH₃, an alkyl group or other substituent may be introduced as N or it may be a polymer substituent.

Sixth Embodiment

This embodiment demonstrates an example wherein a polymer precursor containing fluorine is employed. Pentafluorobenzoyloxy phenyl methacrylate,

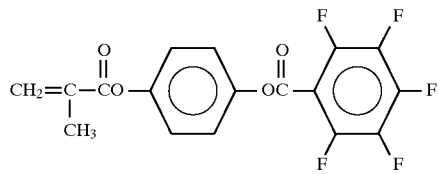

was used as the polymer precursor, and the liquid crystal, substrate and production conditions were produced under the same conditions as in the case of the first embodiment. Measurements of the electro-optical characteristics illustrated that the display condition began to invert at 3.3 V (5% reflectivity) and became saturated at 4.6 V (200% reflectivity).

The polymer precursor employed may be a compound with a fluorine in the other polymerizable portion of the example, shown above; e.g.,

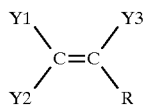

where Y1, Y2, Y3 and R are substituents.

In the case here, at least one of Y1, Y2 and Y3 contain fluorine, and it is desirable to use H, F, CH₃, CF₃ or other alkyl group, but other substituents may be employed. R should be an ester substituent containing at least one or more phenyl groups. For example, —CO₂—C₆F₄—C₆F₅, —CO₂—C₆F₄—C₆F₄—OCO—C₆F₅ (F can be partially H or other substituent, e.g., phenyl group, or the like may be employed. The ester group may be bonded in reverse. It is more desirable that fluorine be substituted for this phenyl group. In addition to an ester substituent, R may be an ether substituent, an alkyl substituent, or the like. However, it is important to select one whose index of refraction is close to that of the liquid crystal. Also, regarding the fluorine substituent and the substituent location, it is desirable to make the polymer precursor and liquid crystal compatible before polymerization, and, then, select the amount of fluorine substituent and the substituent location after polymerization such that the liquid crystal and dichroic dye do not become compatible. R may contain the polymer location shown above; i.e., there may be plural polymerizable portions in one compound. For example, compounds, such as,

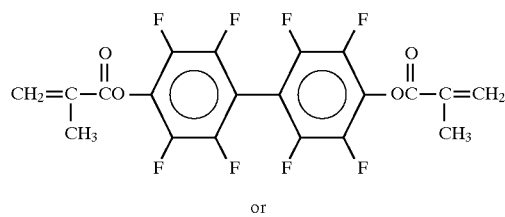

or

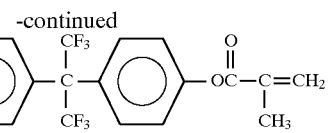

may be employed. In the case shown here wherein all of the substitution modes of the benzene ring were at the para position, the meta position and ortho position may also be used. Further, a mixture of these polymer precursors or other polymer precursors, e.g., biphenyl acrylate, can be employed. The polymerizable portion may be acrylic, methacrylic, crotonic acid, fumaric acid, maleic acid, a vinyl group, an epoxy group or other polymer group. Polymers that may undergo ultraviolet polymerization or electron beam polymerization or heat polymerization may be employed.

Seventh Embodiment

This embodiment demonstrates an example wherein an alkyl group or an alkoxy group is substituted either directly or indirectly for the aromatic ring as the polymer precursor.

First, an example is shown that uses a polymer precursor with an alkoxy group on the aromatic ring in the first embodiment. Other than the polymer precursor, the display element produced under the same conditions as in the case of the third embodiment. Here, 4-(4'-benzoyl)phenyl methacrylate,

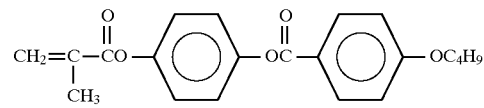

was employed as the polymer precursor. When the electro-optical characteristics were measured using the same method according to the first embodiment, the display began to invert at 3 V (5% reflectivity) and became saturated at 4.5 V (200% reflectivity). The transmissive type display had a similar effect.

As another example, a polymer precursor with an alkyl side chain on the aromatic ring in the first embodiment was employed. Other than the polymer precursor, the display element was produced under the same conditions as in the case of the third embodiment. Here, 4-(4'-pentylbenzoyl) phenyl methacrylate,

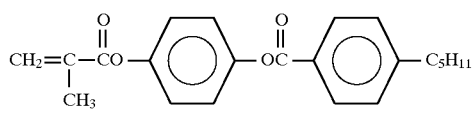

was employed as the polymer precursor. When the electro-optical characteristics were measured according to the same method as in the first embodiment, the display began to invert at 3 V (5% reflectivity) and became saturated at 4.4 V (200% reflectivity).

As a further example, an alkyl chain is bonded to the basic skeleton formula shown in the second embodiment. Here, 4-methacryloyloxy phenyl-4'-butoxy phenylcarbamate,

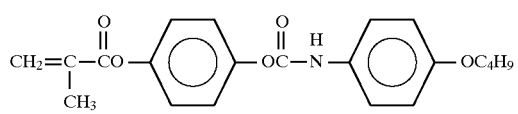

was employed as the polymer precursor. The display element was produced under the same conditions as in the case of the first embodiment. The electro-optical characteristics of the element were measured according to the method of the first embodiment. The display began to invert at 3.4 V (5% reflectivity), and the display became saturated at 4.8 V (180% reflectivity).

In a further example, an alkoxy group is bonded to the basic skeleton formula shown in the third embodiment. The display element was produced under the same conditions as in the case of the first embodiment. Here, 4-methacryloyloxy-4'-hexyloxy tolan,

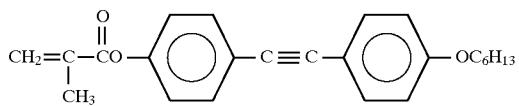

was employed as the polymer precursor. The electro-optical characteristics of the element were measured according to the method of the first embodiment. The display began to invert at 3.4 V (5% reflectivity), and the display became saturated at 5.4 V (200% reflectivity).

As a further example, an alkyl group or an alkoxy group are indirectly bonded to the aromatic ring:

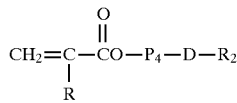

where, R is H or $CH_3$,
$P_4$ includes an aromatic ring,
D is an ester, ether, amide or alkyl chain, and
$R_2$ is an alkyl group or alkoxy group.

Here, the group that bonds the aromatic ling and the alkyl group is an ester, ether, amide or alkyl chain. The characteristics do not significantly change depending on the structure of this position.

With the employment of the polymer precursor in this embodiment, the threshold voltage can be lowered while, at the same time, the reflectivity is improved by introducing an alkyl group or an alkoxy group. The compounds shown in all of the embodiments of this invention may be used as basic polymer precursors. As to the length of the alkyl group or alkoxy group, lengths up to nine carbon atoms have been tested, and their operation in conjunction with a display element has been confirmed. When the alkyl group or the alkoxy group is too long, the reflectivity rises and the contrast suffers. Three to six carbon atoms are desirable, and they may either be bonded directly to the aromatic ring or bonded via an ether bond, ester bond or other hetero atom. Regarding the substitution position, all experiments were performed with para substitution, but the same effect can also be expected with meta-substitution or ortho-substitution. Also, there are cases in which substitution on the alkyl group or alkoxy group can be performed with a halogen atom, a cyano group or other atom or group with a large dipole moment. These substituents may be substituted on plural aromatic rings. Here, the polymerizable portion may be acrylic, methacrylic, crotonic acid, fumaric acid, maleic acid, a vinyl group, an epoxy group or other polymer group. The $CH_3$ of the methacrylic group in the chemical formula may an alkyl group or other substituent.

Eighth Embodiment

This embodiment demonstrates an example wherein the polymer precursor is optically active element. The polymer precursor used was 4'-(2"(S)-methyl propyloxy)biphenyl-4-methacrylate,

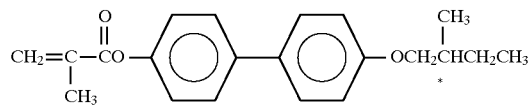

and the liquid crystal material, element and production conditions were produced under the same conditions as in the case of the first embodiment. The electro-optical characteristics of the element were measured. This measurement showed that the display condition began to invert at 3 V (5% reflectivity) and became saturated at 5 V (200% reflectivity).

Even if the polymer precursor is other than that employed in this embodiment, the same effect can be demonstrated, as long as it is optically active. For example, precursors that satisfy the general formula,

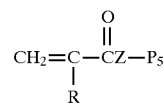

where, R is H or $CH_3$,
$P_5$ is optically active and includes an aromatic ring, and
Z is O or N.
e.g., 4-(2'(S)-methyl propyloxy)phenyl methacrylate,

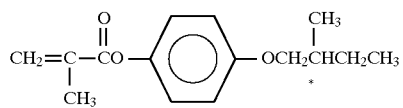

can be employed. In other words, substituents with a chiral center may be introduced in the compounds of all of the embodiments of the invention. The substitution mode used here for the aromatic ring was para substitution, but meta substitution or ortho substitution may also be employed. Also, substitution can be performed at the same time with another substituent. An optically active polymer precursor may be employed as one component of the polymer precursor. Here, the polymerizable portion may be acrylic, methacrylic, crotonic acid, fumalic acid, maleic acid, a vinyl group, an epoxy group or other polymer group. The R in the chemical formula may be an alkyl group or other substituent.

In a further example, an optically active polymer precursor is used comprising a 1:1 ratio mixture of 4'-(2"(S)-methyl propyloxy)biphenyl-4-methacrylate and 4-biphenyl methacrylate was employed as the polymer precursor. The remaining configuration and production method and conditions were according to those in the first embodiment.

The element produced in this manner demonstrated a characteristic between that of the previous example of this embodiment and a prior art example. The molecular rotary power of the optically active polymer precursor differs depending on its skeleton formula. Since the drive voltage increases if the molecular rotary power becomes too large, it is necessary to dilute with an optically active polymer precursor as is the case here.

An optically S material was employed as the optically active material in this embodiment, but an optically R material may also be similarly employed. Also, though a chiral component was not included in the liquid crystal used here, a chiral component can be mixed in the compound to improve contrast and brightness of the display.

Ninth Embodiment

This embodiment demonstrates an example where a two-function polymer precursor and a single-function polymer precursor are mixed together. The polymer precursor used here was a mixed in a ratio of 2:1 of cyano biphenyl methacrylate and phenyl di-methacrylate,

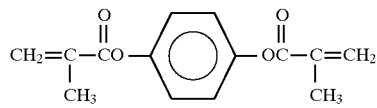

Figure 3:
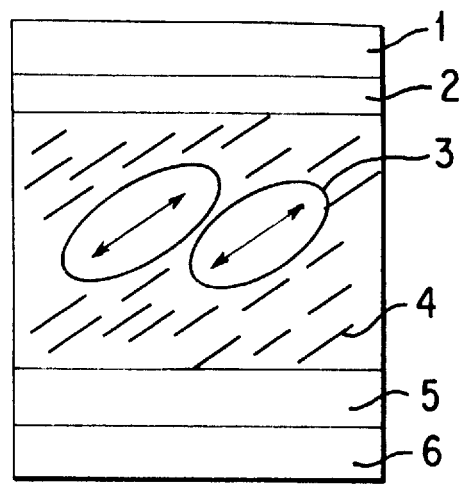
FIG. 3 is a diagrammatic cross sectional view of an incline aligned display element according to the first embodiment of this invention.

The mix ratio is not limited to that above. The liquid crystal, element and production conditions were the same as in the first embodiment. By this means, the thermal resistance and reliability of the electro-optical conditions were improved without sacrificing the characteristics of the single-function polymer precursor. Moreover, in the prior art case, the polymer grains melt at 100° C., but in the case here, polymer grains do not melt up to 120° C. The same effect was observed relative to the polymer precursors in all the embodiments of this invention. The two-function polymer precursors that may be mixed with the single-function polymer precursor include,

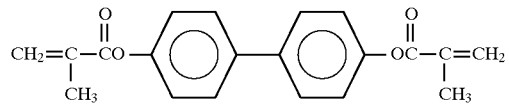

the compound shown in FIG. 3, and polymer precursors that have a liquid crystal phase, such as,

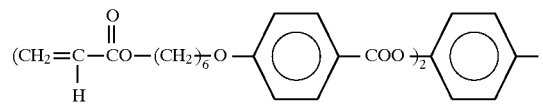

used by Hikmet, et al., and compounds, such as,

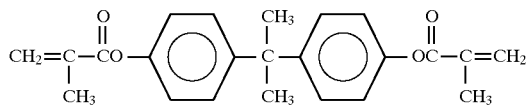

with a bis-phenol A skeleton formula. In this case, an aromatic ring need not necessarily be included. For example, an acrylic or methacrylic group can be attached at either end of the alkyl chain, such as,

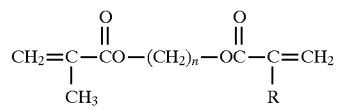

R is H or $CH_3$, and
n is a positive number.

Here, the polymerizable portion may be acrylic, methacrylic, crotonic acid, fumaric acid, maleic acid, a vinyl group, an epoxy group or other polymer group. The R in the chemical formula may be an alkyl group or other substituent. Also, the polymer precursor need not have two functions, but, rather, may be a multifunction polymer precursor with three or more functions, e.g., product No. M7100 available from Toa Gosei K K.

Tenth Embodiment

This embodiment demonstrates an example in which two types of polymer precursors are employed. The same substrate as in the first embodiment was used. Here, the precursors 4-benzoyloxy phenyl methacrylate and methacryloloxy phenyl-4'-methyl phenylcarbamate,

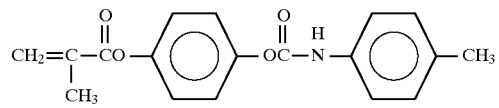

were employed and were mixed in a ratio of 1:1 (W:W). The display element was produced under the same conditions as in the case of the first embodiment.

The electro-optical characteristics of the element were measured according to the method of the first embodiment. The display began to invert at 3.5 V (5% reflectivity), and became saturated at 5 V (180% reflectivity).

When two or more types of polymer precursors are mixed, the polymer precursors relative to all of the embodiments of this invention may be employed as the mixed precursors. Also, the amounts mixed and the composition ratio with liquid crystal are not limited by this embodiment and must be optimized as required. Multifunction polymer precursors, such as those in the ninth embodiment, may be mixed with a single-function polymer precursor mixture such as employed in this embodiment. The polymerizable portion may be acrylic, methacrylic, crotonic acid, fumaric acid, maleic acid, a vinyl group, an epoxy group or other polymer group.

Eleventh Embodiment

This embodiment demonstrates an example employing a substrate having undergone vertical alignment treatment. A cross section of the display element according to this embodiment is illustrated in FIG. 2. The production method for the display element for this embodiment is explained below. The surface of the substrate undergoes vertical alignment treatment and, except for the liquid crystal, product No. RDP00775, available from Rodic Company, containing very little or no component and having a negative dielectric anisotropy, the liquid crystal is the same as that employed in the first embodiment.

The polymer precursor employed is 4'-fluoro-biphenyl methacrylate,

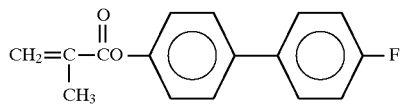

The electro-optical characteristics of the element were measured according to the method of the first embodiment. However, a non-directional reflective plate is used as the reflective plate. At 7 V, the display began to invert (100% reflectivity), and the display became saturated at 15 V (10% reflectivity). Since the characteristic is reversed from that of horizontally aligned type of displays, the display element should be expected to satisfy other different applications. It can be used in transmission types and can be applied to light bulbs. The polymer precursor employed here is only representative of the polymer precursors of this invention, as any of the polymer precursors provide is this invention may be employed. The liquid crystal may also be different from the one employed here as long as it has a large An value and has a negative dielectric anisotropy. Also, the display element functions as a display element whether or not a dichroic dye is included in the mixture.

Twelfth Embodiment

This embodiment demonstrates an example wherein the direction of alignment of the polymer is inclined with respect to the substrate surface. FIG. 3 is a cross section of the display element according to this embodiment. The production method of the display element is explained below. Product No. JAS23 and product No. JIB, both of which are available from Nihon Gosei K K, were mixed in a ratio of 1:1, were applied relative to a pre-tilt alignment treatment accomplished on the surfaces of substrates 1 and 6 on which electrodes 2 and 5 were formed. The mixture then underwent horizontal alignment treatment after drying. Except for the substrate alignment preparation, the display element of this embodiment was produced under the same conditions as in the case of the first embodiment.

The display began to invert at 3 V (5% reflectivity) and became saturated at 4 V (170% reflectivity). Thus, as can be seen, the drive voltage is comparatively lower. The polymer precursor employed here is only representative of the polymer precursors that may be employed, as any of the other polymer precursors of this invention may also be employed. Also, the substrate treatment of this embodiment can be applied in connection with all of the embodiments of this invention.

Thirteenth Embodiment

In this embodiment, an example is demonstrated wherein a polymer precursor described above was employed. Product No. RDP00536, available from the Rodic Company, which has a high resistance, was employed as the liquid crystal, product No. S-1011, available from Merck Co., is employed as the chiral component, and product No. S-344, available from Mitsui Toatsu Senryo K K, is employed as the dichroic dye. Further, active elements are employed on the element substrate. First, product Nos. S-1011 and S-344 were mixed with liquid crystal, product No. RDP00536, in ratios of 0.5% and 1.5%, respectively, and, then, 4-benzoyloxy phenyl methacrylate, employed in the first embodiment and tetrafluoro-di-phenyl methacrylate were mixed in ratios of 8% and 2%, respectively.

Figure 4:
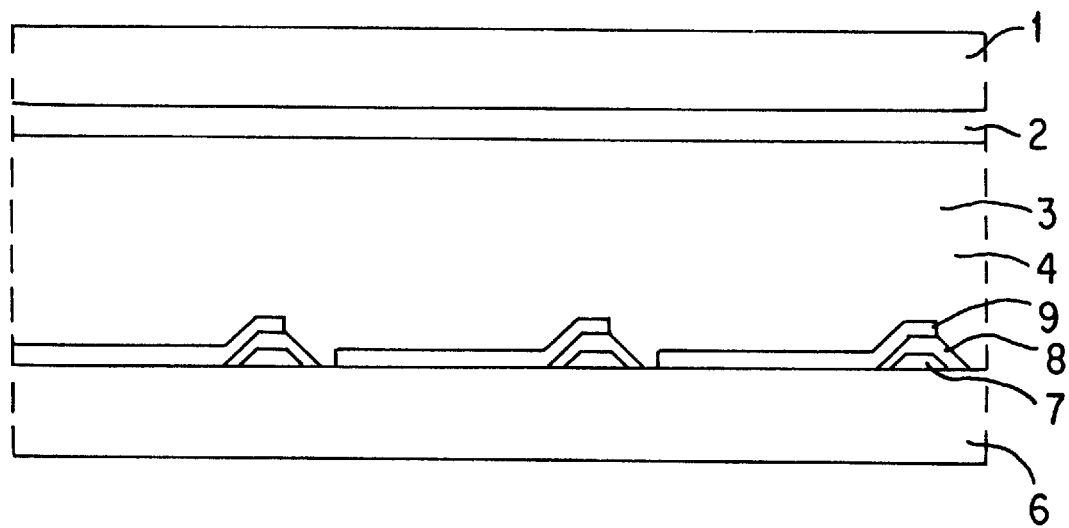
FIG. 4 is a partial cross sectional elevation of a display element employing active elements according to a thirteenth embodiment of this invention.

FIG. 4 shows a partial cross section of the display element according to this embodiment utilizing MIM elements as active elements. ITO was formed for transparent electrode 2 on substrate 1, and then alignment treatment was applied to the surface. After a tantalum layer was formed on substrate 6, the surface was oxidized to form insulation layer 8, on which reflective picture element electrodes 9, receiving non-directional reflectivity treatment as required, were formed. A protective layer may be formed on the element surfaces to protect the active elements. This surface is then subjected to an alignment treatment. Substrate 1 and substrate 6 were separated by a gap of about 5 $\mu$m with the electrode surfaces of the substrates were in facing relationship. Then, substrates 1 and 6 were fixed in position such that the directions of alignment applied on the upper and lower substrates were substantially parallel.

In the embodiment here, the active element substrate underwent reflectivity treatment and the opposing substrate was made transparent, but the opposing substrate may undergo reflectivity treatment and the element substrate may be made to be transparent. Also, though the reflective layer and the electrodes were formed as one unit here, the electrodes and reflective layer may be formed separately.

The mixed liquid crystal components, described above, were then injected into the empty panel space, and the polymer precursors were polymerized by ultraviolet light irradiation whereby the liquid crystal and polymer were phase separated.

A signal, having a selection period of 60 $\mu$m and a non-selection period of 16 ms, was utilized for driving the MIM element produced according to this embodiment, the display element inverted at a signal peak value of 35 V with 150% reflectivity. The reason for the low reflectivity compared with the previous embodiments is because the numerical aperture of the active element substrate was only 70%.

Any type of liquid crystal may be employed as long as the material has high retention, has a generally high resistivity, e.g., greater than $1 \times 10^{10}$ $\Omega$·cm, has a large dielectric constant, and has a large birefringence value.

The chiral component is not limited to the one employed in this embodiment as a polymer precursor with a chiral center, such as, that presented in the eighth embodiment, may be employed here as the chiral component. Also, the mix ratio is not limited to that employed, but if too much chiral component is included, there is a tendency for the hysteresis to increase and raise the drive voltage.

The dichroic dye should have little absorption in the ultraviolet band and have a large dichroic ratio. The color of the dye can be selected according to the desired application. The amount of dye contained is not limited to the amount used here, but if too much is included, the dye may crystallize or darken the display.

A polymerization initiator was not employed in this embodiment, but one may be employed together with an optical sensitizer. However, care should be taken as the resistivity tends to easily drop in value.

Any of the polymer precursors according to all of the embodiments of this invention may be employed as the polymer precursor in this embodiment. In particular, if two-function or multifunction polymer precursors are mixed, display burn-in, upon manufacture of the display, or other such treatment, is not easily accomplished, even if the polymer precursor content is reduced. The content of polymer precursor need not be that utilized in this embodiment. However, if the content of the precursor is too small, light scattering is reduced. If the content of the precursor is too large, the drive voltage is increased.

The polymerization conditions may be those of the first embodiment. However, polymerization should be done with care since the resistivity can easily drop in value. A light intensity of 3 MW/cm$^2$ was used, but other intensity values may be employed. If the light intensity is reduced, the polymerization time is lengthened, and if the light intensity is increased, the polymerization time is shortened. However, if the light intensity is too strong, the resistivity drops in value. Polymerization is simplified if some slight heating, such as in the range of 20° to 50° C., is applied at the time of photopolymerization.

Aluminum was employed for the reflective electrodes, but silver, nickel, chrome, and the like may be employed for the electrodes as long as they are capable of reflecting light. Also, the electrodes can be made transparent and reflective back plate may be utilized on the backside of the display element.

MIM elements were employed in this embodiment as the active elements, but TFT elements or other elements capable of driving liquid crystal material may be employed.

Alignment treatment may be performed by any method that orients the liquid crystal. As shown in the twelfth embodiment, the liquid crystal may be inclined with respect to the substrate surface. Vertical alignment treatment may also be employed. However, in this case, a liquid crystal with a negative dielectric anisotropy must be employed. The direction of alignment treatment may be optimized depending on the application since the resulting direction of distinct visibility accordingly changes.

In this embodiment, reflectivity treatment need not be performed, and the element may be used as a transmissive type display element or a light control valve if the dichroic dye is not included in the liquid crystal mixture.

Fourteenth Embodiment

Figure 5:
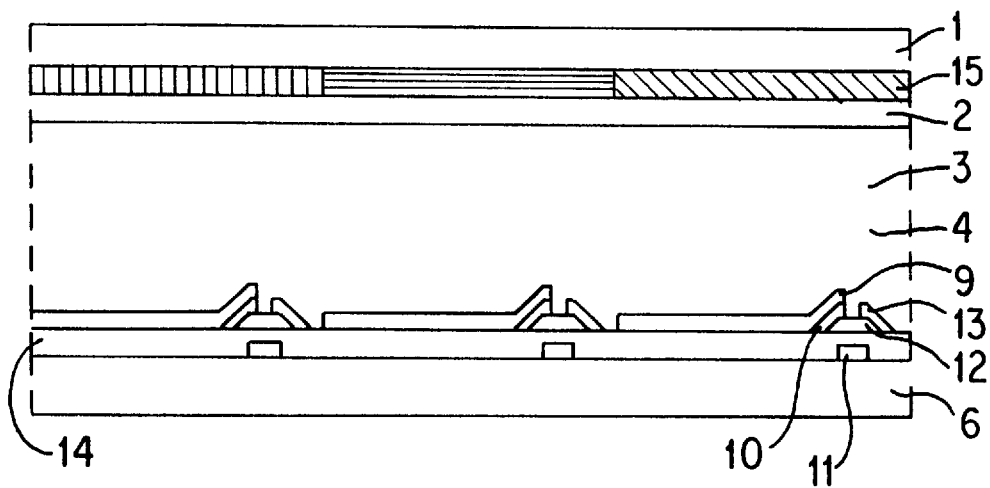
FIG. 5 is a partial cross sectional elevation of a display element employing a color filter according to a fourteenth embodiment of this invention.

In this embodiment, an example is provided wherein a color filter is employed in conjunction with active elements. FIG. 5 is a partial cross section of a color display element that employs TFT elements as the active elements. In practice, picture elements corresponding to each color like those shown here are arranged in a mosaic or lattice. Liquid crystal 4 and polymer layer 3 of the thirteenth embodiment may be employed in this embodiment. In fabrication of a display element, first, gate electrodes 11 were formed on substrate 6, followed by gate insulation layer 14, semiconductor layer 12, drain electrodes 13, source electrodes 10 and picture element electrodes 9 were formed. The electrodes 9 may undergo non-directional reflectivity treatment if required. A protective layer may be formed on picture element electrodes 9 in order to protect the active elements. The top of picture element electrodes 9 then underwent alignment treatment. Next, color filter 15 was formed on opposing substrate 1, followed by transparent electrode 2. Then, the surface of electrode 2 underwent alignment treatment.

As described above, the two substrates with electrodes are, then, mated together such that the liquid crystal layer is about 5 μm thick. The liquid crystal layer need not be 5 μm, but if this spacing is too thick, the drive voltage increases and the TFT elements are not capable of driving the alignment of the liquid crystal. Here, the active element substrate underwent reflectivity treatment, but, alternatively, the opposing substrate may undergo reflectivity treatment. Also, the color filter may be positioned on the front side or on the reflective substrate side of the display element. The color filter may also be positioned between the substrates or between the electrodes and the liquid crystal layer.

A mixture of liquid crystal corresponding to the display mode and polymer precursors employed was provided in the gap and an external electric field is applied to orient the mixture.

The liquid crystal, polymer precursor, dichroic dye, chiral component and the production conditions employed in this embodiment may be the same as those in the thirteenth embodiment.

In this embodiment, reflectivity treatment need not be performed, and the element may be employed as a transmissive type display element or a light control valve if the dichroic dye is not included.

This embodiment permits the production of a full color, reflective type, large capacity color display element.

In addition to TFT elements and MIM elements, TFT and MIM elements with configurations different from those illustrated in the foregoing embodiments may be employed as the active elements. In this regard, active elements employing ferroelectric material may also be employed as an active element.

Fifteenth Embodiment

In this embodiment, an example is demonstrated that employs, as a polymer precursor, a polymer compound having an epoxy group as at least one component. In this example,

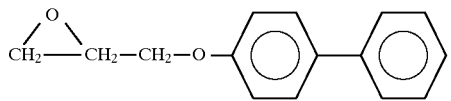

was employed, and the display element was produced with the same materials and production methods as were employed in conjunction with the first embodiment. However, in addition, 5% of the product No. SP-150, available from Asahi Denka Kogyo K K, was employed with the polymer precursor as a polymerization initiator. The display element produced in this manner provided the same characteristics as in the case when methacrylic or acrylic polymer, utilized in previous embodiments, were employed, i.e., the display condition began to invert at 3.5 V and the display condition inverted at 5 V.

The polymer precursor employed in this embodiment is a compound of a previous embodiment having a polymerized portion comprising an epoxy group and principally represented by the following compounds,

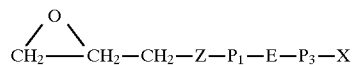

where, $P_1$ and $P_3$ include aromatic rings,

E includes an ester group, urethane group, amide group, acetylene group, and

X is H, CN, F, Cl, Br, I, aromatic ling, alkyl group or alkoxy group (may contain other elements),

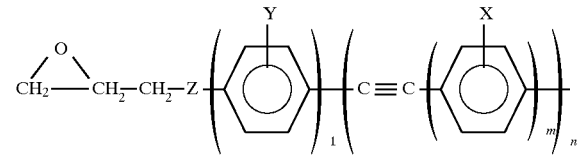

where, X, Y are substituents, l, m are positive integers (including zero), and n is a positive number,

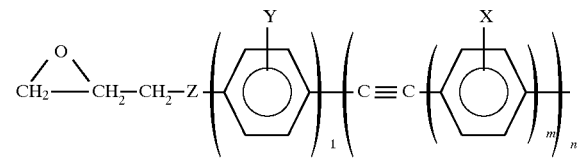

where, X, Y are substituents, l, m are positive integers (including zero), and n is a positive number,

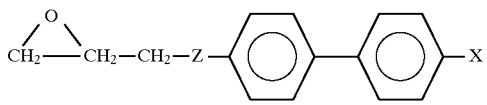

where, X is H, CN, F, Cl, Br, I, an aromatic ring (which may contain other elements), and
multiple biphenyl groups may be substituted at X,

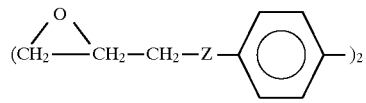

where, the biphenyl group may have a substituent group, and the biphenyl group may be a phenyl group,

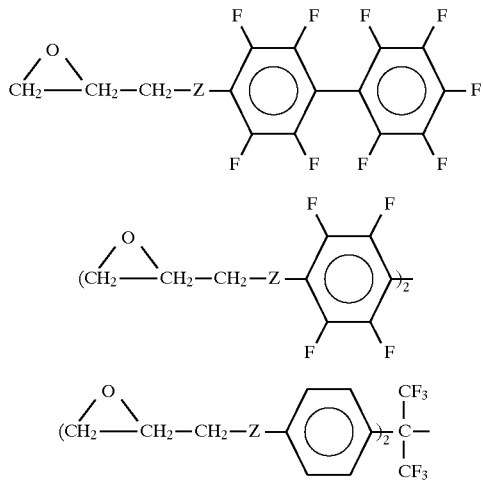

Z in the chemical formula is either O or N. If Z is N, one more epoxy group or side chain may be inserted. In the cases here, the compounds most commonly derived from epichlorohydrin as epoxy groups are illustrated, but any type of substituent may be included as long as an epoxy group is introduced. Also, an alkyl, an ethyl, an ester, an amide or a urethane group may be utilized as a spacer between the epoxy group and the aromatic ring. The electro-optical characteristics of the display element when utilizing the compounds illustrated here had characteristics similar to the results achieved in the previous embodiments, but the overall drive voltage tended to be higher.

A sensitizer or a polymer medium may be used as a photopolymerization initiator in addition to product Nos. SP-150, SP-170, UVE-1014 and UVE-1016, available from General Electric Co., and product Nos. Cyracure UVI-6974 and UVI-6990, available from UCC, or other such materials functioning as an initiator when the epoxy resin is hardened by means of light. The mixing ratio can be a small amount because the initiator acts as a catalyst to the polymer precursor. Since the absolute amount varies depending on the polymer precursor, it should be optimized as the application requires. If the mix ratio is too high, however, the resistivity of the element drops and its reliability is also degraded.

Sixteenth Embodiment

In this embodiment, an example is demonstrated wherein the polymer precursor employed in the previous embodiment is polymerized in advance and is made compatible with the liquid crystal by heating, and the polymer was precipitated from the liquid crystal by cooling.

The polymer precursor employed was 4-benzoyloxy phenyl methacrylate and the liquid crystal was a combination of product No. TL202, available from Merck Co., together with product No. CB15, available from BDH Company, as the chiral component, and product No. S-428, available from Mitsui Toatsu Senryo K K, as the dichroic dye. First, the polymer precursors were polymerized by ultraviolet light to form the polymer wherein they were heated to 120° C. to render them compatible with the liquid crystal, and then they were inserted between two electrode-equipped substrates that had undergone alignment treatment. The final display element was cooled at a rate of 1° C./min. to provide for precipitation of the polymer in an aligned state. The slower cooling rate is performed, the better. If cooling is accomplished too fast, the polymer grains are precipitated out of solution without being aligned.

In this embodiment, the element will function as long as the ratio of polymer to liquid crystal is in the range between 3:97 and 50:50. Also, the chiral component and dichroic dye need not be included in the mixture. Other than those shown here, the polymer precursors, liquid crystal, chiral component, and dichroic dye, as applied in previous embodiments, may be employed. In this embodiment, two substrates were employed, but the display element may be produced by applying the above to one substrate and treating them similarly and then forming the opposing electrode. It is also possible to fabricate a display element by mating separate substrates on which liquid crystal polymer layers have been formed. Also, active elements may be employed in one of the substrates, as previously illustrated in conjunction with FIGS. 4 and 5, whereby large capacity display panels can be realized. It is also possible to include a color filter, as illustrated in a previous embodiment, to provide a color display.

Seventeenth Embodiment

In this embodiment, an example is demonstrated wherein the polymer precursor employed in the previous embodiment is polymerized in advance and, further, is made compatible with the liquid crystal through heating, after which the polymer is precipitated out of the liquid crystal by means of cooling.

The polymer precursor used was 4-(p-pentylbenzoyloxy) phenyl methacrylate and a combination comprising liquid crystal, product No. MJ90657, available from Merck Co.; chiral component, product No. CM20, available from Chisso K K; and a dichroic dye, product No. S-344, available from Mitsui Toatsu Senryo K K, which are mixed together. Initially, the polymer precursors were polymerized by ultraviolet light to form the polymer. The polymerized polymer precursor and the liquid crystal were then made compatible employing methyl ethyl ketone as a solvent. The mixture was then spread out on an electrode-equipped substrate that had previous undergone alignment treatment. This structure was, next, dried by heating at 50° C. to remove the solvent, and the polymer was precipitated out in an aligned state. Next, an opposite electrode-equipped substrate was mated with this prepared polymerized polymer precursor substrate to form a display element.

If the aligned state of the precipitated polymer appears to be in a poor state, a heating-cooling process, such as utilized in the sixteenth embodiment may be performed after the solvent has been removed.

In this embodiment, the element will function as long as the ratio of polymer to liquid crystal is in the range between 3:97 and 50:50. The chiral component and dichroic dye need not be included in the mixture. Macromolecule precursors, liquid crystal, chiral component, and dichroic dye employed in previous embodiments may also be employed in this embodiment. While two substrates were used in this embodiment, the display element may be produced by applying to one substrate, the prepared polymerized polymer coating after which the opposing electrodes are formed. It is also possible to make a display element by mating single substrates on which liquid crystal polymer layers have been respectively formed. Also, active elements may be employed on the prepared polymerized polymer substrate whereby a large capacity display element can be realized. It is also possible to combine a color filter, as illustrated in a previous embodiment, to produce a color display.

Eighteenth Embodiment

Figure 6:
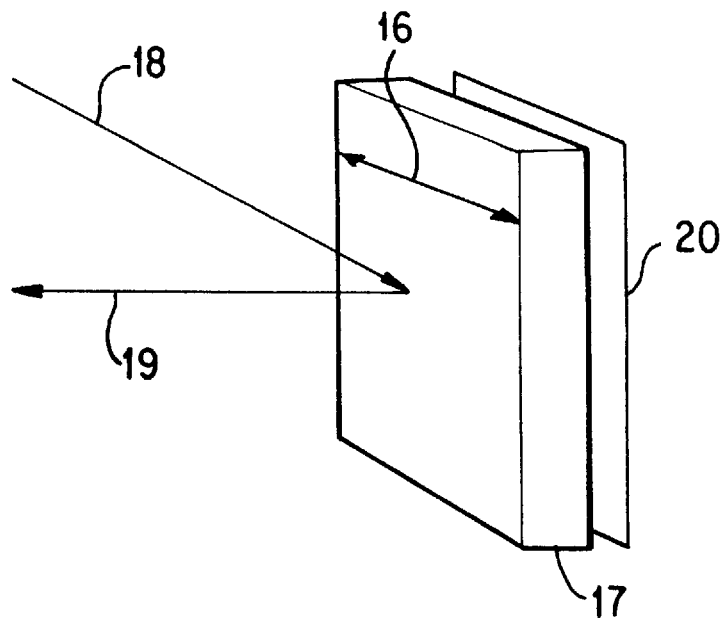
FIG. 6 is a perspective view of a display element according to an eighteenth embodiment of this invention.
Figure 7:
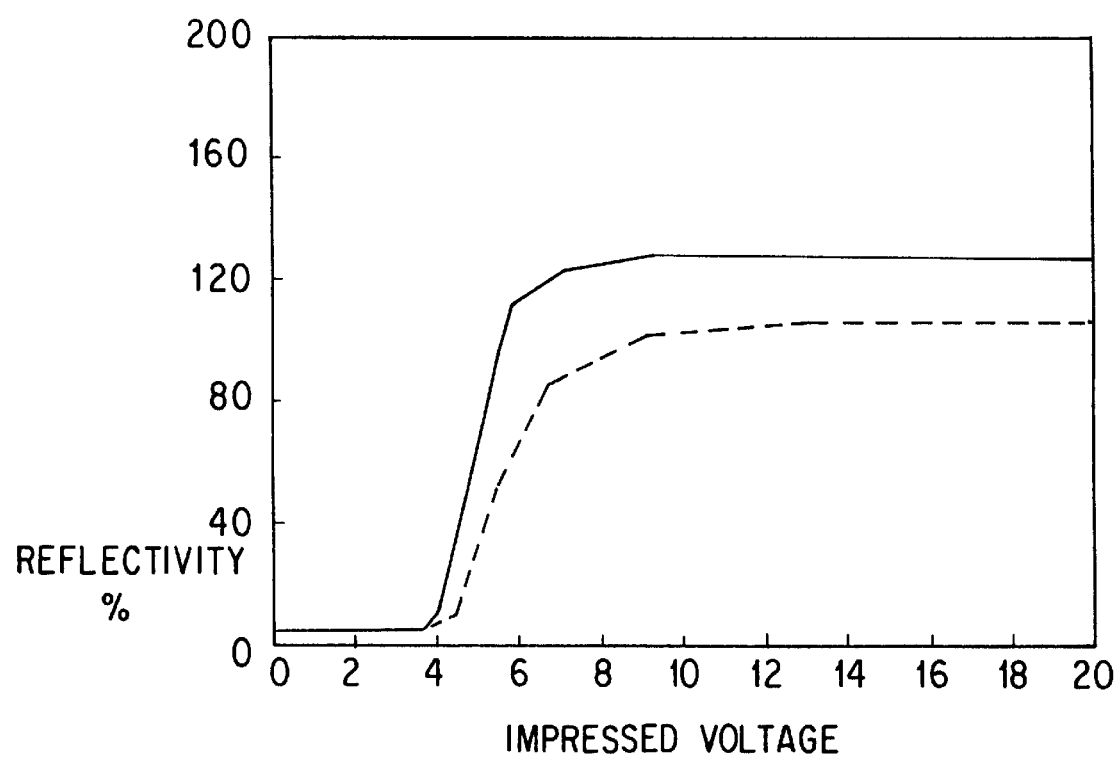
FIG. 7 is a graphic illustration of the electro-optical characteristic of a display element according to the eighteenth embodiment of this invention.

In this embodiment, an example is demonstrated in FIG. 6 wherein, relative to the substrates that provide alignment of the liquid crystal and polymer, direction 16 of alignment treatment of at least the substrate on the light incident side of the display element is perpendicular to the plane containing principal direction 18 of incident light and also normal relative to direction 19 of the substrate. In FIG. 6, a reflector plate 6 is also employed on the back of the display element. In this embodiment, however, direction 16 of alignment treatment is also applied to the rear substrate as well as to the front substrate. Also, for the sake of example comparison, an example is shown wherein the display element is disposed having a direction of alignment treatment rotated 90° with respect to the direction of alignment treatment of this embodiment. The configurations and production methods employed in other embodiments of this invention may be employed relative to the display element of this embodiment. The electro-optical characteristics of a display element according to this embodiment, including a polymerized polymer/liquid crystal mixture together with a dichroic dye and chiral component, are illustrated in FIG. 7. The solid line in FIG. 7 relates to this embodiment while the dashed line relates to the comparison example. As shown in FIG. 7, the electro-optical characteristics of this embodiment are improved by about 30% over the comparison example. In addition to making the direction of alignment treatment on the rear substrate the same as on the front substrate, an effect like that illustrated here can be achieved by choosing any other direction.

Nineteenth Embodiment

In this embodiment, reference is made to FIGS. 8 and 9 illustrating an example wherein a optical phase shift plate 21 and a reflective plate or a light scattering plate 20 are disposed on the back of substrates that include a layer of liquid crystal and polymer previously aligned and dispersed in the layer. FIG. 8 shows an example wherein the liquid crystal and polymer are aligned horizontally with respect to the substrate surface, and FIG. 9 shows an example wherein the liquid crystal and polymer are aligned perpendicularly with respect to the substrate surface.

The principal involved is illustrated employing a ¼-wavelength plate as the optical phase shift plate 21 in a system in which a dichroic dye is mixed with the liquid crystal and the polymer, but a chiral component is not employed.

First, in FIG. 8, the vertically and horizontally polarized components of the incident light 18 are considered separately. The liquid crystal/polymer layer 17 is aligned in horizontal direction 16. Also, the direction of alignment of ¼-wavelength plate 21 is disposed such that it is inclined 45° with respect to the direction of alignment of the liquid crystal/polymer layer.

Figure 8A:
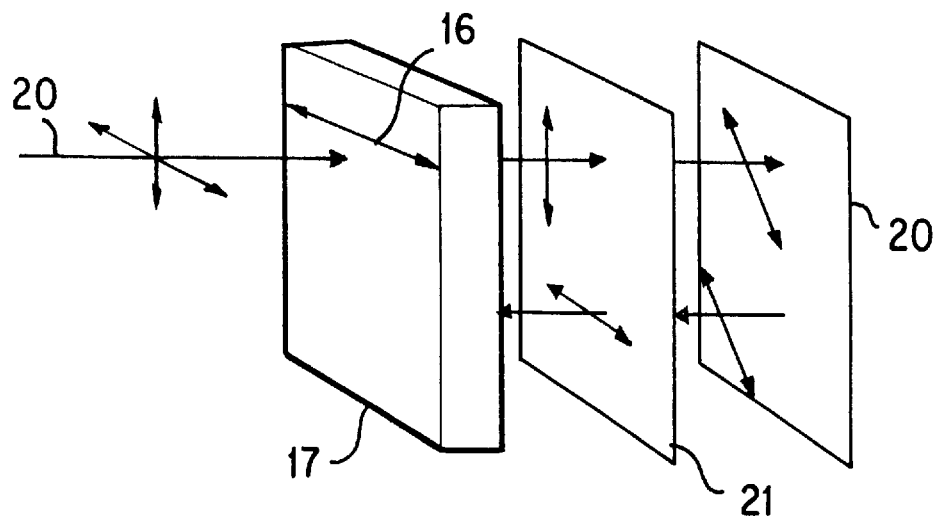
FIG. 8A a perspective view of a horizontally aligned display element according to a nineteenth embodiment of this invention in the absence of an applied field.

In the case of FIG. 8A, with no electric field applied, vertically polarized light is not absorbed by the dichroic dye, passes through liquid crystal/polymer layer 17, passes through ¼-wavelength plate 21, is reflected or scattered at plate 20, and passes again through ¼-wavelength plate 21, whereby its polarization plane is rotated 90°. Therefore, absorption by the dichroic dye in the liquid crystal/polymer layer occurs this time, and the reflected, returning light is not emitted out of the front the display element. On the other hand, horizontally polarized light is absorbed by the dichroic dye in the liquid crystal/polymer layer.

Figure 8B:
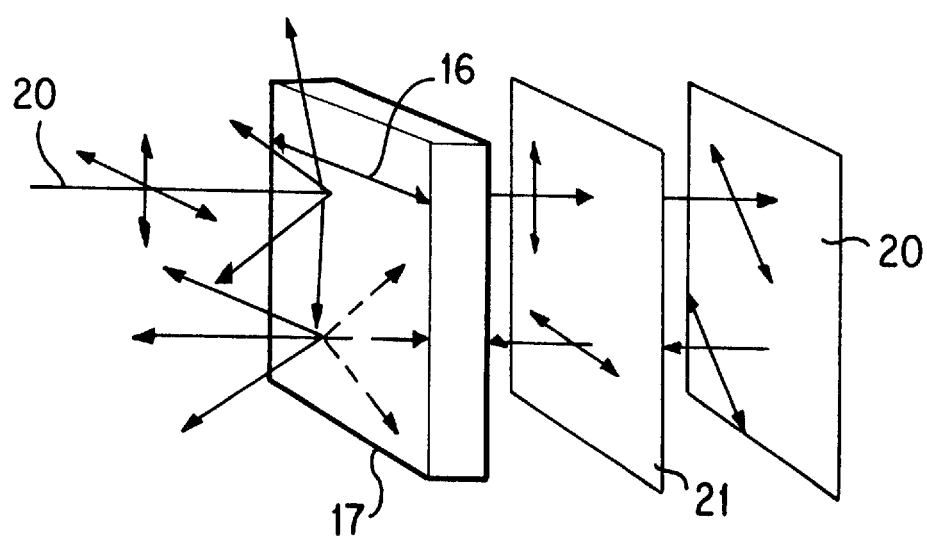
FIG. 8B a perspective view of a horizontally aligned display element according to a nineteenth embodiment of this invention under the conditions of an applied field.

In the case of FIG. 8B, with an electric field applied, absorption by the dichroic dye is decreased. When vertically polarized light enters the display element this time, it passes through the liquid crystal/polymer layer, passes through ¼-wavelength plate 21, is reflected or scattered by light scattering plate 20, and passes again through ¼-wavelength plate 21, whereby its polarization plane is rotated 90°. Therefore, this time the light is scattered in the liquid crystal/polymer layer with light exiting from the display element. When horizontally polarized light enters the display element, light scattering occurs in the liquid crystal/polymer layer with light exiting from the display element. By this means, all of the polarized light, i.e., natural light, can be effectively modulated by the display element.

Figure 9A:
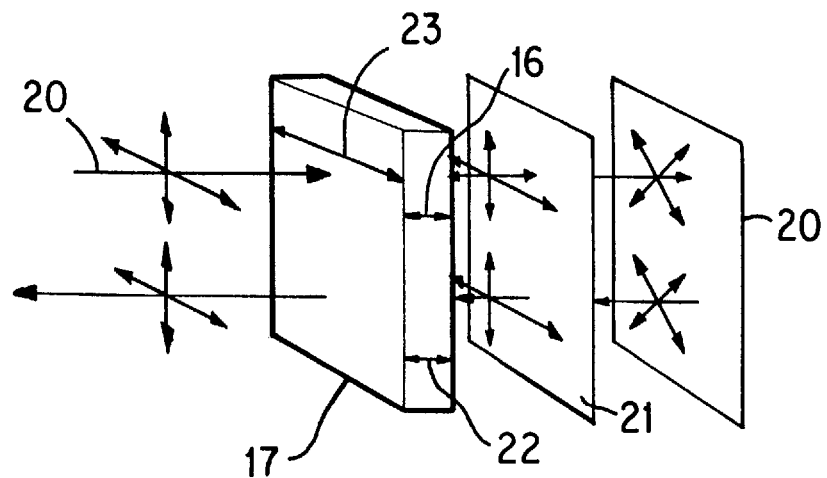
FIG. 9A a perspective view of a vertically aligned display element according to the nineteenth embodiment of this invention in the absence of an applied field.
Figure 9B:
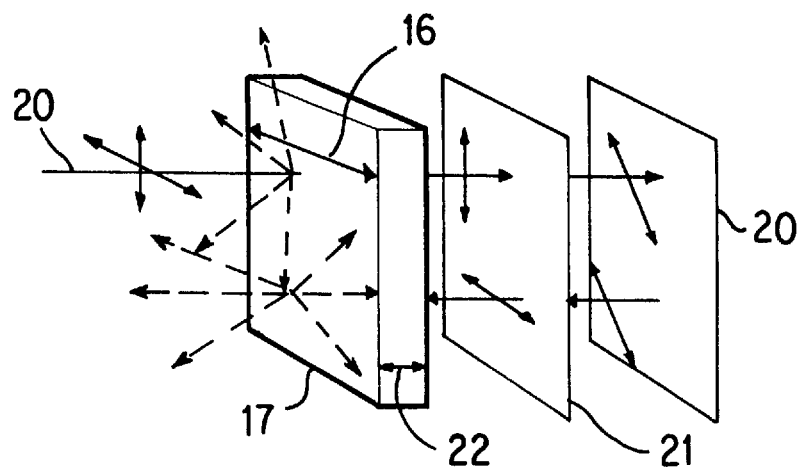
FIG. 9B a perspective view of a vertically aligned display element according to the nineteenth embodiment of this invention under the conditions of an applied field.

In FIG. 9, liquid crystal/polymer layer 17 is vertically aligned as indicated at 16, where incident light enters layer 17, and at 22, where returning light enters layer 17, and is only slightly inclined toward horizontal direction 23 with respect to the substrate surface. In FIGS. 9A and 9B, ¼-wavelength plate 21 is disposed so that it is inclined 45° with respect to horizontal direction 23.

In the case of FIG. 9A, with no electric field applied, neither vertically polarized light or horizontally polarized light are scattered and absorbed, resulting in this light being scattered or reflected back and out of the display element.

In the case of FIG. 9B, with an electric field is applied, the liquid crystal and dichroic dye become principally aligned in horizontal direction 23. When vertically polarized light strikes the element at this time, it passes through liquid crystal/polymer layer 17, passes through ¼-wavelength plate 21, is either scattered or reflected by plate 20, and passes again through ¼-wavelength plate 21. Since the polarization plane is rotated 90° at this time, the polarized light is both absorbed by the dichroic dye in the liquid crystal/polymer layer and scattered at the liquid crystal/polymer interface. When horizontally aligned light enters the display element, it is both absorbed by the dichroic dye in the liquid crystal/polymer layer and scattered at the liquid crystal/polymer interface. Therefore, all of the polarized light, i.e., natural light, can be effectively modulated by the display element.

The foregoing light modulating configuration can be applied with respect to all of the embodiments of this invention. For example, this embodiment can be applied where a chiral component is mixed in the liquid crystal/polymer layer, or it can be applied where a dichroic dye is not included in the liquid crystal/polymer layer, thereby increasing the scattering strength it is also possible to combine this embodiment with active elements to form a large capacity display or to combine the embodiment with a color filter to provide a color display.

Twentieth Embodiment

Figure 10A:
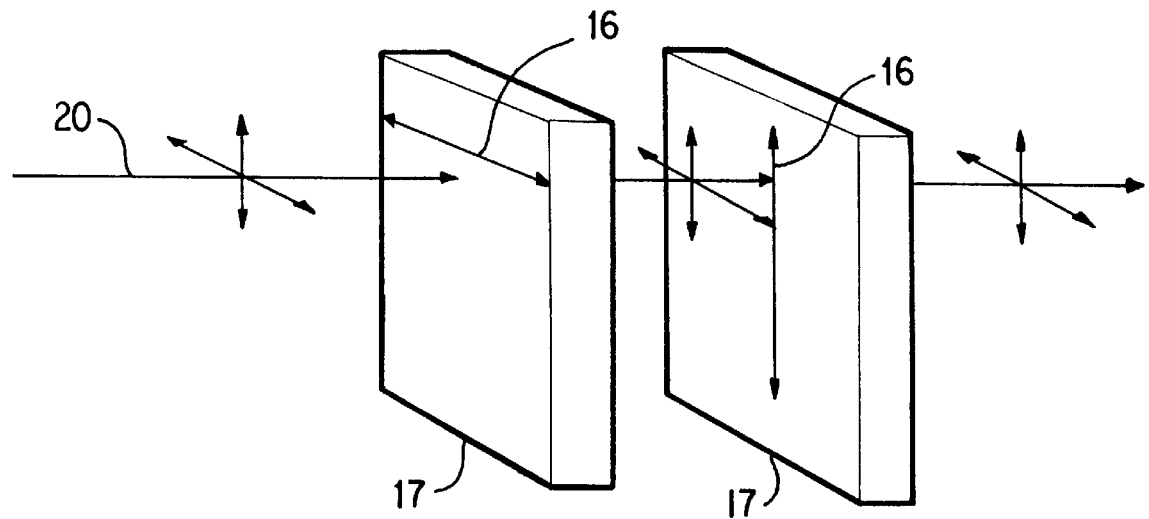
FIG. 10A a perspective view of two mated display elements according to a twentieth embodiment of this invention in the absence of an applied field.
Figure 10B:
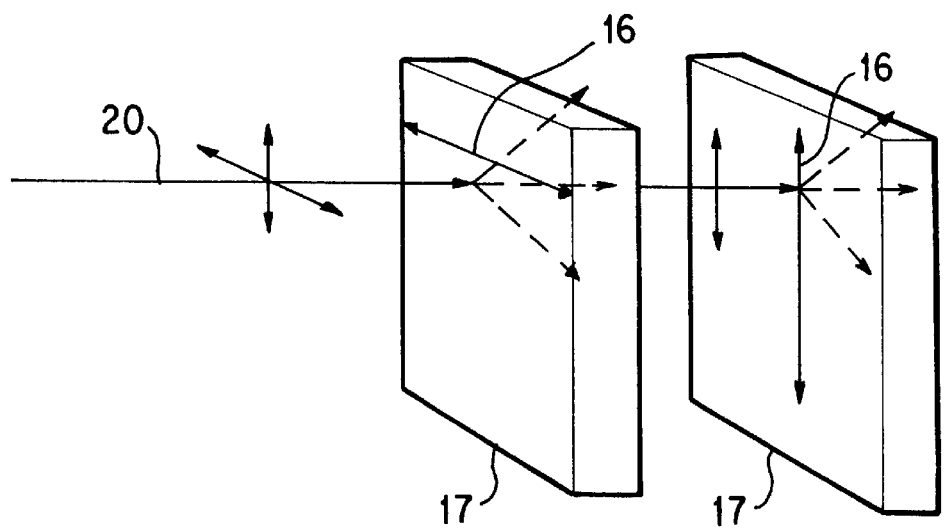
FIG. 10B a perspective view of two mated display elements according to a twentieth embodiment of this invention under the conditions of an applied field.

In this embodiment, shown in FIG. 10, an example is illustrated wherein two display elements of either of the embodiments of FIGS. 8 and 9 may be included together. In the case here, two horizontally aligned display elements of FIG. 8 are mated together such that their alignment directions are perpendicular to one another, as indicated by the two separate arrows 16 in FIGS. 10A and 10B. With respect to the principal of operation, one more display elements replace the optical phase shift plate and reflection plate of the nineteenth embodiment such that the directions of alignment are perpendicular to one another, and the combined display element operates in the same manner as that embodiment. In other words, since the scattering characteristic of the display element of the invention in which there is no or very little chiral component is dependent on polarization when an electric field is applied, the polarized light, which passes through the first display element without being scattered, is scattered by the second display element, which is disposed such that it does scatter light, whereby all polarized light, i.e., natural light, can be effectively modulated.

The foregoing light modulating configuration can be applied with respect to all of the embodiments of this invention. For example, this embodiment can be applied where a chiral component is mixed in the liquid crystal/polymer layer, or it can be applied where a dichroic dye is not included in the liquid crystal/polymer layer, thereby increasing the scattering strength it is also possible to combine this embodiment with active elements to form a large capacity display or to combine the embodiment with a color filter to provide a color display.

The compounds shown in all the foregoing embodiments can be mixed with compounds set forth in other embodiments and employed in other embodiments. In many cases, the resulting electro-optical characteristics are midway between the electro-optical characteristics achieved when the respective compounds are separately employed.

When a non-reflective layer or a reflective scattering layer is provided on the display element back surface relative to all of the foregoing embodiments, the resulting display provides an easier view.

A display element in which very little or no chiral component mixed in the liquid crystal/polymer layer provides a polarization characteristic in all of the foregoing embodiments, and, therefore, can be employed in an electric field, control type polarization element.

In summary, the display element of this invention provides a reflective type display element of easy viewing and high brightness, compared to prior art displays which are dark and difficult to view. Further, the display element of this invention also facilitates the combination of active elements, which are difficult to accomplish in prior art displays, thereby facilitating the production of large capacity, reflective type displays. Also, the display element of this invention makes possible reflective type, full color, large capacity displays for computer terminals and reflective type wall-mounted television displays, and also may be employed as an electric field, control type polarization element through the use of a simple configuration.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. A liquid crystal element having at least one substrate portion and an optical layer comprising liquid crystal and polymer dispersed in said liquid crystal, said polymer comprising polymer grains being substantially aligned in the same alignment direction as said liquid crystal in absence of an applied electric field, said polymer grains developed from the polymerization of at least one polymer precursor containing at least one polymerizable portion and at least two aromatic rings with a coupling group bonded to said aromatic rings, said at least one polymer precursor containing, as at least one component, a polymer compound without an alkyl group spacer between said polymerizable portion and said aromatic rings.

2. The liquid crystal element of claim 1 wherein said coupling group comprises an alkyl group or an alkoxy group bonded directly to said aromatic rings.

3. The liquid crystal element of claim 1 wherein said coupling group comprises an alkyl group or an alkoxy group bonded indirectly to said aromatic rings.

4. The liquid crystal element of claim 1 wherein said coupling group comprises at least one of a cyano group, a halogen group or an aromatic ring bonded indirectly to said aromatic rings.

5. The liquid crystal element of claim 1 wherein said coupling group comprises at least one of a cyano group, a halogen group or an aromatic ring bonded directly to said aromatic rings.

6. The liquid crystal element of claim 1 wherein said coupling group comprises an ester group.

7. The liquid crystal element of claim 1 wherein said coupling group comprises a urethane group or an amide group.

8. The liquid crystal element of claim 1 wherein said coupling group comprises at least one acetylene group.

9. The liquid crystal element of any one of the claims 1, 6, 7 and 8 wherein at least one of said aromatic rings may be hydrogenated.

10. The liquid crystal element of any one of claims 6 through 8 or 1 through 5 wherein said polymer grains are elliptical needle-shaped grains and are linked in series.

11. The liquid crystal element of any one of claims 6 through 8 or 1 through 5 wherein said polymer precursors are selected from the group consisting of an ester derivative with methacrylic acid or acrylic acid, an amide derivative with methacrylic acid or acrylic acid, and a compound containing an epoxy group.

12. The liquid crystal element of any one of claims 6 through 8 or 1 through 5 wherein said optical layer includes a dichroic dye.

13. The liquid crystal element of any one of claims 6 through 8 or 1 through 5 wherein said optical layer includes a chiral component.

14. A liquid crystal element having at least one substrate portion and an optical layer comprising liquid crystal and polymer dispersed in said liquid crystal, said polymer comprising polymer grains being substantially aligned in the same alignment direction as said liquid crystal in absence of an applied electric field, said polymer grains developed from the polymerization of at least one polymer precursor containing at least one polymerizable portion and at least two aromatic rings with a coupling group bonded to said aromatic rings, said at least one polymer precursor containing, as at least one component, a polymer compound without an alkyl group spacer between said polymerizable portion and said aromatic rings and contains a halogen bonded to at least one of said aromatic rings.

15. The liquid crystal element of claim 14 wherein said halogen is fluorine.

16. The liquid crystal element of claim 14 wherein said polymer grains are elliptical needle-shaped grains and are linked in series.

17. The liquid crystal element of claim 14 wherein said polymer precursors are selected from the group consisting of an ester derivative with methacrylic acid or acrylic acid, an amide derivative with methacrylic acid or acrylic acid, and a compound containing an epoxy group.

18. The liquid crystal element of claim 14 wherein said optical layer includes a dichroic dye.

19. The liquid crystal element of claim 14 wherein said optical layer includes a chiral component.

20. The liquid crystal element of claim 15 wherein said polymer grains are elliptical needle-shaped grains and are linked in series.

21. The liquid crystal element of claim 15 wherein said polymer precursors are selected from the group consisting of an ester derivative with methacrylic acid or acrylic acid, an amide derivative with methacrylic acid or acrylic acid, and a compound containing an epoxy group.

22. The liquid crystal element of claim 15 wherein said optical layer includes a dichroic dye.

23. The liquid crystal element of claim 15 wherein said optical layer includes a chiral component.

24. The liquid crystal element of claim 14 wherein said coupling group comprises at least one group selected from the group consisting of an ester group, a urethane group, an amide group and an acetylene group.

25. The liquid crystal element of claim 14 wherein said polymer precursor is selected from the group consisting of compounds having one of the following general formulae:

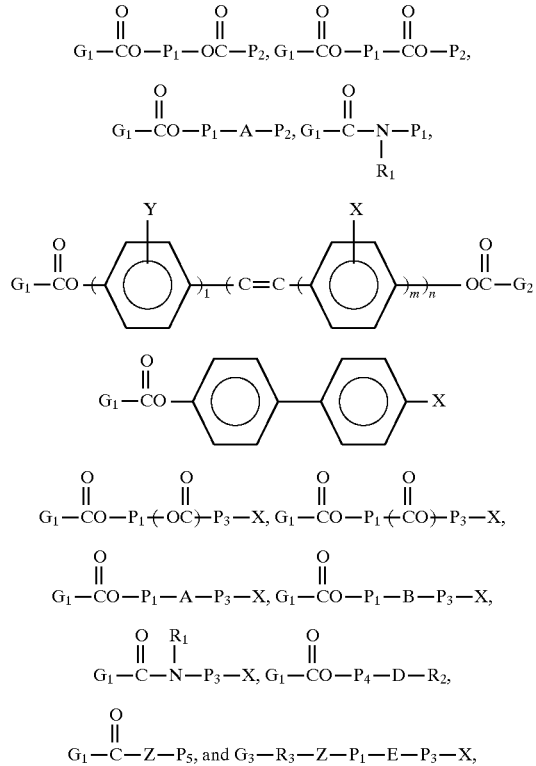

wherein:

G$_1$ is selected from the group consisting of acrylic acid, methacrylic acid, crotonic acid, fumaric acid, maleic acid, vinyl, and epoxy groups, optionally substituted with a halogen or an alkyl group, or is a compound having the formula:

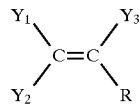

wherein Y$_1$, Y$_2$, and Y$_3$ are independently selected from hydrogen, fluorine, an alkyl group and a fluorinated alkyl group and wherein at least one of Y$_1$, Y$_2$, and Y$_3$ contains fluorine, and wherein R is an ether group, an alkyl group, or an ester group with one or more phenyl groups;

P$_1$, P$_2$, P$_3$ and P$_4$ are independently selected from groups containing an aromatic ring, optionally substituted with one or more of hydrogen, a cyano group, a halogen, an alkyl group and an alkoxy group;

A is selected from the group consisting of OCONH, NHCOO, NHCO and CONH;

G$_2$ is independently selected from the group consisting of G$_1$ and H;

X and Y are substituents selected from the group consisting of CN, a halogen, an aromatic ring, an alkyl group, and an alkoxy group;

l and m are integers of 0 or greater;

n is an integer of 1 or more;

R$_1$ is selected from the group consisting of H, CH$_3$ and an alkyl group;

B is an acetylene group;

D is a group selected from the group consisting of an ester group, an ether group, an amide group and an alkyl group;

R$_2$ is an alkyl group or an alkoxy group;

Z is O or N;

P$_5$ is an optically active group comprising an aromatic ring, optionally substituted with one or more of hydrogen, a cyano group, a halogen, an alkyl group and an alkoxy group;

G$_3$ is an epoxy group

R$_3$ is selected from the group consisting of an alkyl group, an ester group, an amide group, and a urethane group; and E is selected from the group consisting of an ester group, a urethane group, an amide group, and an acetylene group.

26. The liquid crystal element of claim 25 wherein P$_1$, P$_2$, P$_3$ and P$_4$ are selected from groups having a phenyl, biphenyl, terphenyl, naphthalene and anthracene group.

27. A liquid crystal element having at least one substrate portion and an optical layer comprising liquid crystal and polymer dispersed in said liquid crystal, said polymer comprising polymer grains being substantially aligned in the same alignment direction as said liquid crystal in absence of an applied electric field, said polymer grains developed from the polymerization of at lest one polymer precursor containing at least one polymerizable portion and at least two aromatic rings with a coupling group bonded to said aromatic rings, said at least one polymer precursor containing, as at least one component, an optically active polymer compound without an alkyl group spacer between said polymerizable portion and said aromatic rings.

28. The liquid crystal element of claim 27 wherein said polymer grains are elliptical needle-shaped grains and are linked in series.

29. The liquid crystal element of claim 27 wherein said polymer precursors are selected from the group consisting of an ester derivative with methacrylic acid or acrylic acid, an amide derivative with methacrylic acid or acrylic acid, and a compound containing an epoxy group.

30. The liquid crystal element of claim 27 wherein said optical layer includes a dichroic dye.

31. The liquid crystal element of claim 27 wherein said optical layer includes a chiral component.

32. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component macromolecule precursor having two or more polymerizable portions.

33. The liquid crystal element of claim 32 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

34. The liquid crystal element of claim 33 wherein a multi-color filter is formed on one of the substrates.

35. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising an amide derivative of methacrylic acid or acrylic acid.

36. The liquid crystal element of claim 35 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

37. The liquid crystal element of claim 36 wherein a multi-color filter is formed on one of the substrates.

38. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising a compound having an epoxy group.

39. The liquid crystal element of claim 38 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

40. The liquid crystal element of claim 39 wherein a multi-color filter is formed on one of the substrates.

41. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising a compound having at least two aromatic rings and an ester group between said aromatic rings.

42. The liquid crystal element of claim 41 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

43. The liquid crystal element of claim 42 wherein a multi-color filter is formed on one of the substrates.

44. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising a compound having at least two aromatic rings and a urethane group or amide group between these aromatic rings.

45. The liquid crystal element of claim 44 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

46. The liquid crystal element of claim 45 wherein a multi-color filter is formed on one of the substrates.

47. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising a compound having at least two aromatic rings and at least an acetylene group between these aromatic rings.

48. The liquid crystal element of claim 47 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

49. The liquid crystal element of claim 48 wherein a multi-color filter is formed on one of the substrates.

50. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising a polymer compound including a halogen atom.

51. The liquid crystal element of claim 50 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

52. The liquid crystal element of claim 51 wherein a multi-color filter is formed on one of the substrates.

53. A liquid crystal element having at least one substrate portion and an optical layer comprising liquid crystal and polymer mutually dispersed in one another, said substrate portion subjected to an alignment treatment effective in the directional alignment of said liquid crystal and said polymer, said polymer comprising polymer grains formed from at least one polymer precursor comprising at least one polymerizable portion and at least one aromatic ring, said polymer precursor undergoing polymerization through externally applied stimulus while aligned with said liquid crystal in a predetermined direction via said substrate portion treatment wherein said liquid crystal element is light transparent in absence of an electric field and is light scattering in presence of an applied electric field, and wherein said at least one polymer precursor contains at least one component comprising an optically active polymer compound.

54. The liquid crystal element of claim 53 wherein said liquid crystal element comprises two substrate portions, said directional alignment of said liquid crystal and macromolecule grains is controlled by alignment treatment subjected to surfaces of both of said substrate portions between which said liquid crystal and polymer are sandwiched.

55. The liquid crystal element of claim 54 wherein a multi-color filter is formed on one of the substrates.

* * * * *